Jan. 18, 1949.   R. W. BROWN   2,459,753
STEERING MECHANISM FOR WHEELED LAND VEHICLES
Original Filed July 23, 1943   3 Sheets-Sheet 1

Inventor
ROY W. BROWN

Inventor
ROY W. BROWN

Patented Jan. 18, 1949

2,459,753

UNITED STATES PATENT OFFICE 2,459,753

STEERING MECHANISM FOR WHEELED LAND VEHICLES

Roy W. Brown, Akron, Ohio, assignor to The Firestone Tire & Rubber Company, Akron, Ohio, a corporation of Ohio Original application July 23, 1943, Serial No. 495,947. Divided and this application April 17, 1946, Serial No. 662,816

2 Claims. (Cl. 280—103)

This invention relates to steering mechanism for wheeled land vehicles, and more especially it relates to steering mechanism for wheeled vehicles that have pneumatic suspension means adapted to effect raising and lowering of the vehicle frame with relation to the ground, when desired.

Such a wheeled vehicle is shown in my copending application for Letters Patent, Serial No. 495,947, now Patent No. 2,415,026, granted Jan. 28, 1947, of which this application is a division.

The chief object of the invention is to provide an improved manner for steering vehicles of the character mentioned. More specifically the invention aims to obviate any binding effect of the steering mechanism as the vehicle wheels bounce up and down, relatively of the vehicle frame, when traveling over rough terrain, or when the pneumatic suspension is operated to change the position of the wheels in the raising and lowering of the vehicle frame. Other objects will be manifest as the description proceeds.

Figure 1:
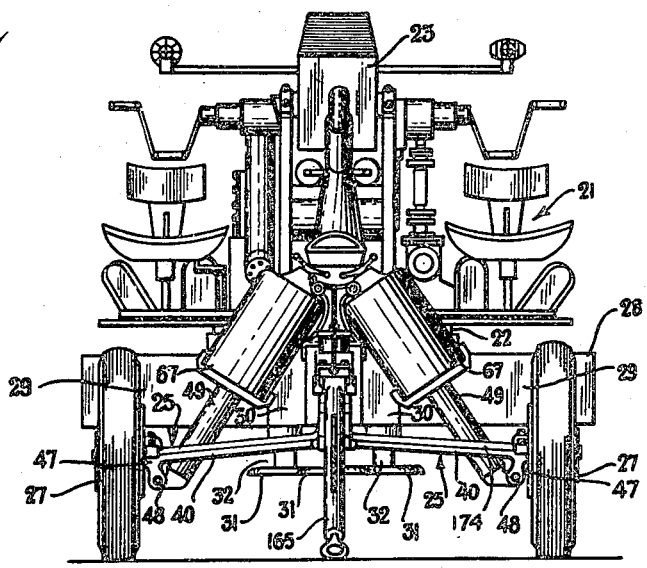
Fig. 1 is a front elevation of a wheeled vehicle embodying the invention, said vehicle being shown in elevated or traveling position.
Figure 2:
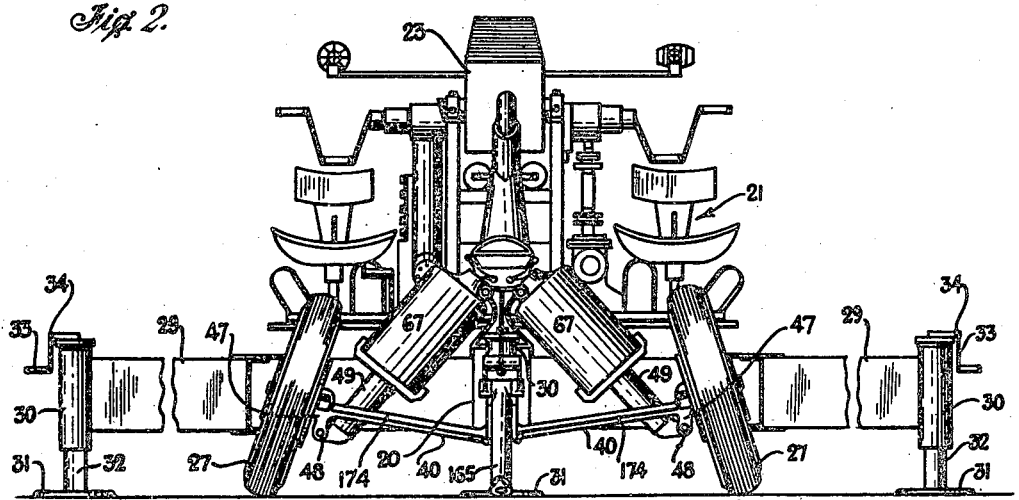
Fig. 2 is a view of the structure shown in Fig. 1 in lowered position.
Figure 3:
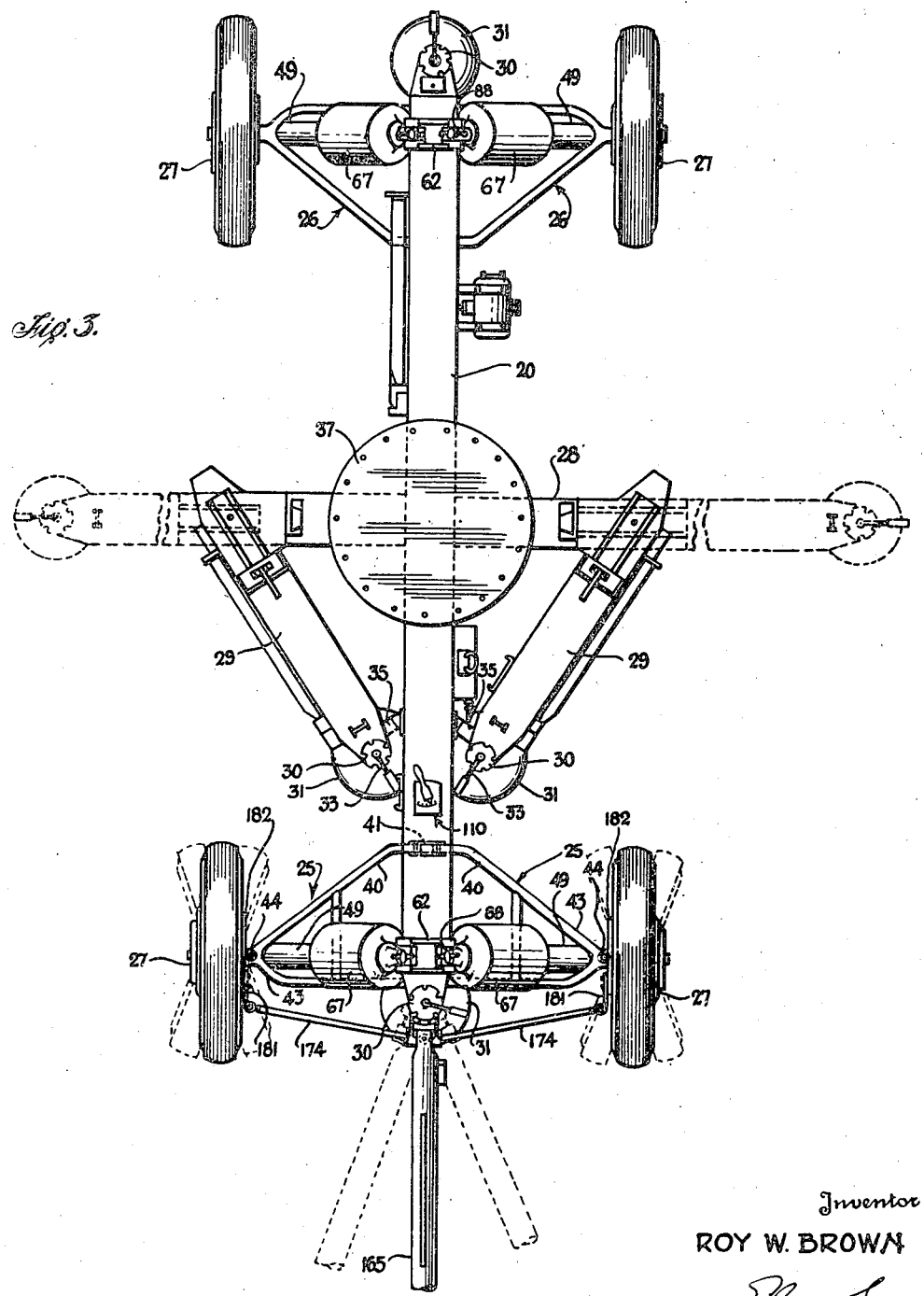
Fig. 3 is a plan view of the bed or frame of the vehicle shown in Figs. 1 and 2, the superstructure being omitted.

Referring now to Figs. 1 to 3 of the drawings, there is shown a wheeled vehicle that comprises a main frame or bed 20 that extends longitudinally of the vehicle, and a top carriage, designated as a whole by the numeral 21, that is supported on said main frame and movable relatively thereof in a horizontal plane, the top carriage being mounted on a turntable 22. As shown, a gun 23 is mounted upon the turntable 22, but since the top carriage and structure carried thereby constitute no part of the present invention, a detailed description thereof will not be required.

The bed or frame 20 is tubular and horizontally disposed, and is substantially rectangular in cross-section. At the front and rear ends of said main frame are transversely disposed wheel-carrying assemblies generally designated 25 and 26 respectively, said assemblies comprising wheels 27 that are provided with suitable pneumatic tires for supporting the vehicle. The frame 20 is provided at a point intermediate the wheel carrying assemblies with a transversely disposed arm 28 to which is pivoted, at the ends thereof, a pair of identical outriggers 29. The outriggers are arranged to be swung from an inoperative folded-back position as shown in full lines in Figs. 1 and 3 to the extended operative position shown in full lines in Fig. 2 and in broken lines in Fig. 3. Each outrigger is provided at its outer end with a screw jack 30 having a ground engaging foot plate 31 that is swivel-connected to the lower end of a post 32. Each post 32 is vertically adjustable by means of a manually operable crank 33, each of the latter being pivoted at 34 to enable folding into the position shown when not in use. Locking means indicated generally at 35, Fig. 3, is provided for retaining the outriggers in traveling position shown in full lines in said figure. Other screw jacks 36 are mounted at the front and rear ends respectively of the main frame 20. A circular base plate 37 is mounted upon the frame members 20, 20 at the intersection thereof, and it is upon base plate 37 that the turntable 22 is mounted.

The wheel-carrying assemblies 25, 26 at the opposite ends of the main frame 20 are of identical construction except for steering mechanism which is associated with the front wheels and which presently will be described. Each assembly comprises a forked arm 40 that has its forks pivotally connected to respective brackets 41, Figs. 4 and 5, by means of hinge pins 42. Said brackets are mounted upon the under side of main frame 20, at spaced points longitudinally thereof, the hinge pins 42 of the two brackets being in axial alignment. At the free outer end of each forked arm 40 the latter is formed with a bearing portion 43 in which is journaled a pin 44 upon which is mounted the axle spindle (not shown) that carries a wheel 27 of the vehicle. Each bracket 41 is of dual construction and carries two hinge pins 42, one for each of the forked arms 40. The arrangement is such that each front wheel 27 may be swung or oscillated relatively of the main frame 20, the hinge pins 42 constituting the axes of oscillation of the wheels. By oscillating the arms 40, the wheels 27 may be tilted from the position shown in Fig. 1 to the position shown in Fig. 2, and vice versa. When the wheels are tilted to the position shown in Fig. 2 the gun 23 is in its lowered, firing position.

For oscillating the forked arms 40 to tilt the wheels 27 as described, suitable fluid pressure operated means is provided, and to this end the bearing portion 43 at the outer end of each arm 40 is formed with a downwardly extending bifurcated ear 47 that carries a pivot pin 48, the latter being disposed transversely of the pin 44, and located below a line that connects the axis of axle spindle (not shown) with the axis of oscillation 42 of the wheel. Pivotally connected to the pivot pin 48 is the lower end of a tubular member 49 that constitutes an element of a fluid pressure operated unit.

The fluid pressure operated unit is pivotally connected at its upper end to an upright standard 62 that is bolted to the top side of the frame 20. The standard 62 is of dual construction so as to serve as an upper anchor for two fluid pressure operated devices. The latter are substantially enclosed, except for the members 49 thereof, in respective hollow metal guards or shields 67 that protect the working parts of the devices from gun fire or other damaging impacts. At the top of each fluid pressure operated device is a handle or knob 88 that controls a braking means (not shown) whereby the movable parts of the device may be secured in determinate position, upon occasion, such as when there is failure of the pressure fluid that operates the device. The fluid pressure operated devices constitute the subject matter of the invention set forth in my co-pending application aforementioned, of which this application is a division; for this reason a fuller description thereof is not believed necessary to the disclosure of the prevent invention.

Figure 4:
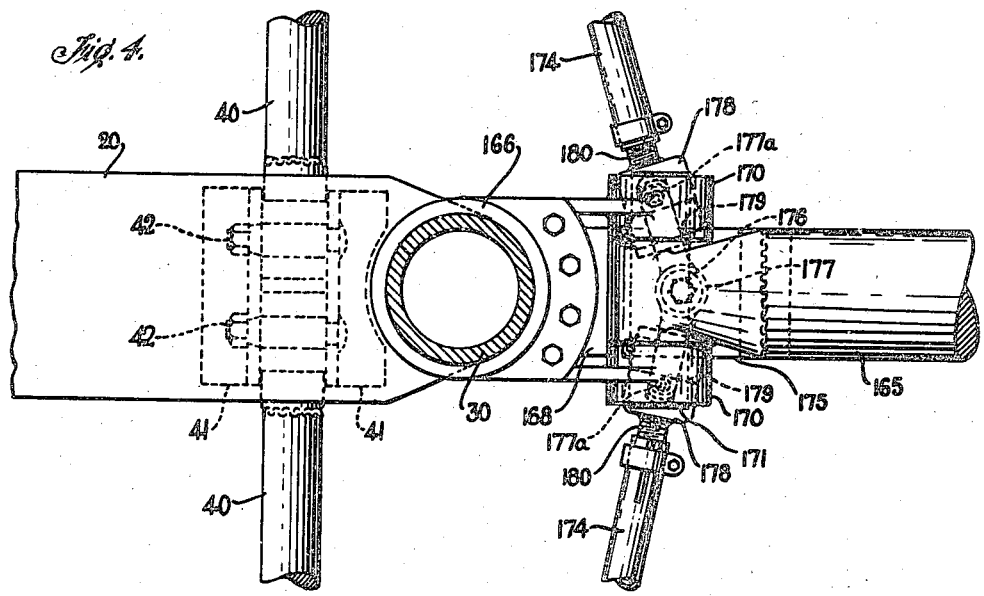
Fig. 4 is a plan view, on a larger scale, of a part of the steering mechanism of the vehicle.
Figure 5:
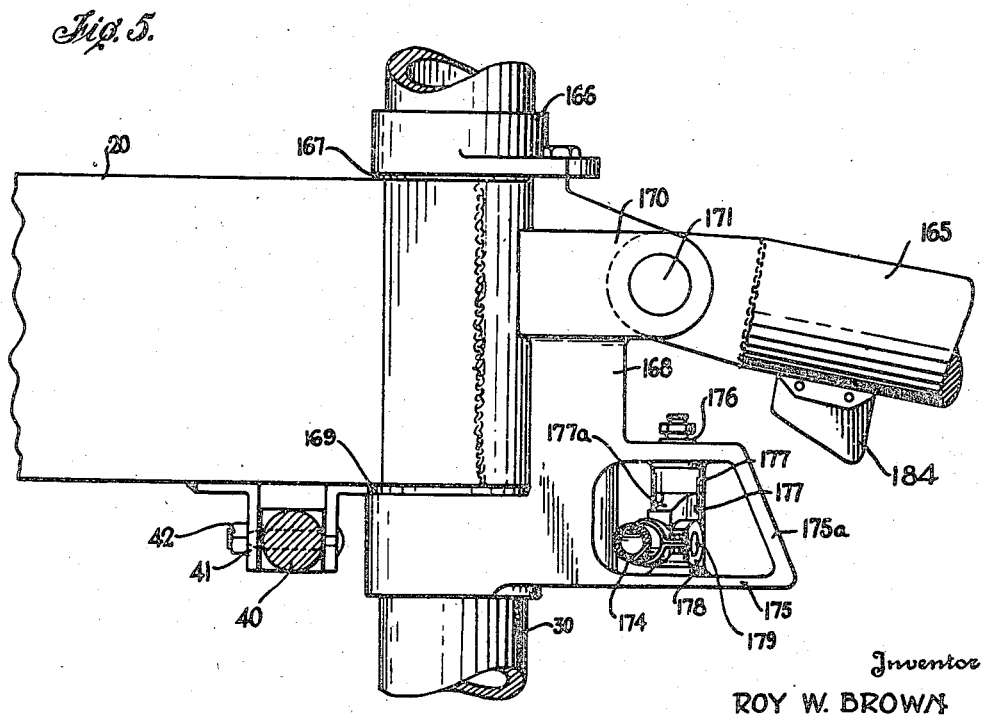
Fig. 5 is a side elevation of the mechanism shown in Fig. 4.

The vehicle is not self-propelled, but is arranged to be drawn by a suitable tractor (not shown) to which it is connected by a draught bar 165, the latter being pivotally connected to the front end of the vehicle. As is best shown in Figs. 4 and 5, the shell or casing of the screw jack 30 at the front end of the vehicle is welded to the front end of the bed or frame 20. Swiveled on the casing of said screw jack 30, above frame 20, is a flanged collar 166, there being a bearing bushing 167 between said collar and the frame portion on which it rests. Swiveled on said screw jack 30, below frame 20, is a bracket structure 168 that extends upwardly and has its upper end bolted to collar 166, whereby said bracket and collar constitute an integral structure. A thrust bearing 169 is positioned between bracket 168 and the under side of frame 20. The arrangement is such that the bracket 168 may swivel about screw jack 30 as an axis. Formed on bracket 168 near the upper end thereof is a pair of spaced-apart, outwardly projecting parallel ears 170, 170, which ears are apertured to receive a horizontally arranged pivot pin 171, the draught bar 165 having an end portion disposed between said ears and pivotally supported on said pin 171.

Steering of the vehicle is effected by means of a pair of steering rods 174, 174 that are operatively connected at one end to the axles of respective front wheels 27 of the vehicle, and at their other ends are connected to the swivelled bracket 168. To this end the bracket 168 is formed at its lower end with a forwardly projecting formation 175 that has an opening therethrough so as to define parallel horizontal top and bottom portions and a downwardly sloped front portion, the latter being designated 175a. Secured at its ends in the top and bottom portions of formation 175 is a vertically positioned pivot pin 176, and pivotally mounted on said pin, within the opening in formation 175, are two hinge elements 177, 177 that are formed with respective ears 177a, 177a that project radially therefrom, substantially in opposite directions. The ears 177a are received within the forked ends of respective connector elements 178, the latter being pivotally connected to said ears by respective pivot pins 179 that are disposed at right angles to the pivot pin 176. The ears 177a of the hinge elements 177 are axially offset from the axial portions of said elements, and to different extents, the arrangement being such that pivot pins 179 are disposed in the same horizontal plane. Furthermore, the pivot pins 179 are in the same horizontal plane as the hinge pins 42 that pivotally connect the forked arms 40 to the brackets 41, and are spaced the same distance from pivot point 176 as the distance from each pivot pin 42 to the centerline of the frame 20.

Each of the connector elements 178 is formed with a threaded stem 180 that has threaded connection with one end of the steering links 174, as shown in Fig. 4, said steering links being hollow or tubular as shown. Each steering link 174 has its outer end pivotally connected to the free end of a short bracket arm 181, Fig. 3, said bracket arm being mounted upon and projecting forwardly from a disc or plate 182 that is secured to an axle spindle at the front end of the vehicle.

The arrangement is such that when the draught bar 165 is turned angularly of the main frame 20, as when turning or rounding a curve, the swivelled bracket 168 also will turn and thus cause the steering rods 174 to turn the front wheels of the vehicle, as is indicated in broken lines in Fig. 3. This enables the vehicle to make shorter turns and also assures that the vehicle will follow the course of its towing tractor and not swing from side to side as frequently is the case with towed vehicles. The feature of having threaded connections between the connector elements 178 and the steering links enables the length of the steering assemblies to be adjusted to a nicety. If desired, similar adjustment features may be incorporated at the outer ends of the steering links. By having the steering link pivots 179 in the same plane as the pivotal connections 42 of the forked arms 40, and substantially in axial alignment therewith when the draught bar is in the medial position shown in full lines in Fig. 3, there is no binding effect as the front wheels of the vehicle bounce up and down when traveling over rough terrain, or when the pneumatic suspension is operated to change the position of the wheels from traveling to firing position, the wheel arms 40 and steering links 174 of each wheel being parallel and disposed in the same plane under all conditions.

Secured to the under side of the draught bar 165, near the pivoted end thereof, is a bumper 184 of rubber or other resilient material, said bumper being so positioned as to bear against the sloping front portion 175a of the projecting formation 175 when the free end of the draught bar is unsupported, whereby said free end of the bar is held off the ground.

From the foregoing description it will be apparent that the invention provides a steering mechanism that is of primary utility in association with wheeled vehicles of the character described, and which achieves the advantages set out in the foregoing statement of objects.

Modification may be resorted to without departing from the spirit of the invention, or the scope thereof as defined by the appended claims.

What is claimed is:

1. In a steering mechanism for wheeled land vehicles the combination of a vehicle frame, a pair of swingable arms pivoted to said frame on respective horizontal axes and projecting to opposite sides of the frame, each of said arms having its free end provided with an axle on which a wheel is mounted, a swiveled bracket disposed on a vertical axis at the front end of said frame, a draught bar pivotally connected to said bracket, and respective steering links pivotally connected at one end to the axle structures and at their other ends to the bracket, the last mentioned connection comprising a vertical pivot pin carried by the bracket structure, a pair of connector elements pivoted on said pin, and horizontally disposed pivotal connections between the steering links and the respective connector elements, the last mentioned pivotal connections being disposed in the same plane as the pivotal connections between the frame and the swingable arms.

2. A combination as defined in claim 1 wherein the last mentioned pivotal connections at the inner end of each swingable arm are substantially in axial alignment with respective pivotal connections between the steering links and connector elements when the draught bar is disposed parallel to the centerline of the vehicle frame.

ROY W. BROWN.

REFERENCES CITED

The following references are of record in the file of this patent:

UNITED STATES PATENTS

| Number | Name | Date |
| --- | --- | --- |
| 1,617,283 | Adkins | Feb. 8, 1927 |
| 2,154,558 | Beemer | Apr. 18, 1939 |
| 2,159,344 | Slack | May 23, 1939 |
| 2,297,591 | Urich | Sept. 29, 1942 |